T. B. ALSUP.
BEAM SPRING TRIP FOR CULTIVATORS, PLOWS, &c.
APPLICATION FILED AUG. 27, 1912.
1,068,832.
Patented July 29, 1913.
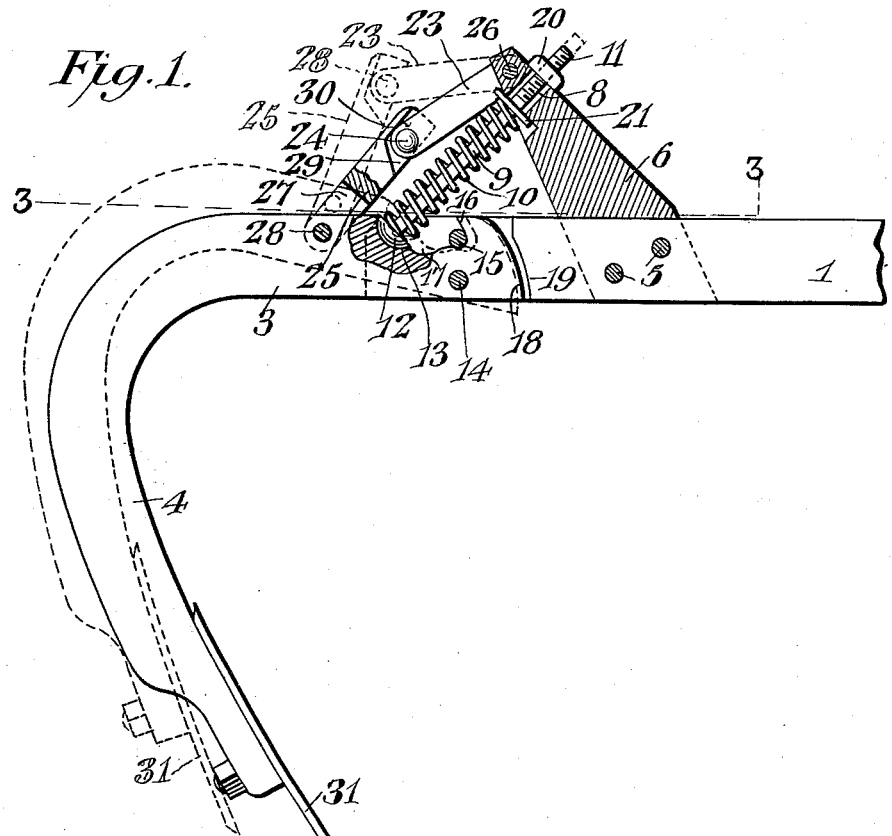
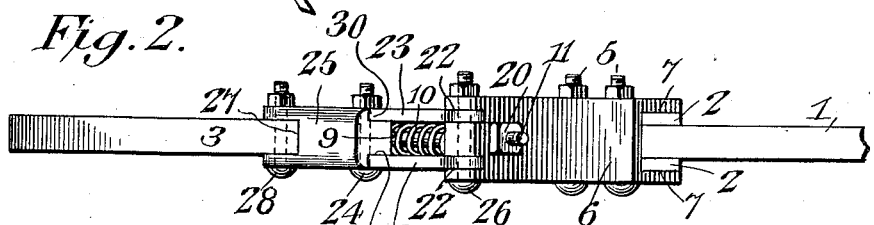
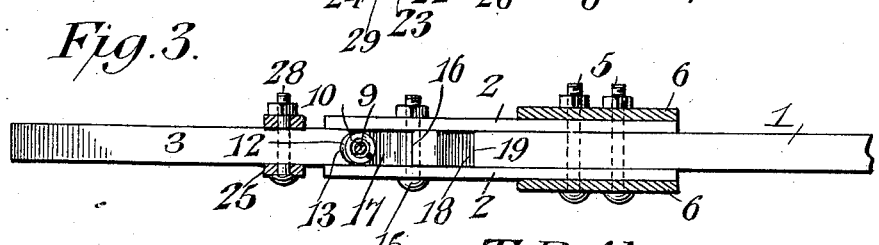
T. B. Alsup, INVENTOR

UNITED STATES PATENT OFFICE.

THOMAS B. ALSUP, OF CANADIAN, TEXAS.

BEAM-SPRING TRIP FOR CULTIVATORS, PLOWS, &c.

1,068,832.  Specification of Letters Patent.  Patented July 29, 1913.

Application filed August 27, 1912. Serial No. 717,290.

*To all whom it may concern:*

Be it known that I, THOMAS B. ALSUP, a citizen of the United States, residing at Canadian, in the county of Hemphill and State of Texas, have invented a new and useful Beam-Spring Trip for Cultivators, Plows, &c., of which the following is a specification.

The invention relates to a beam spring trip for cultivators, plows, etc.

The object of the present invention is to improve the construction of spring trips, and to provide a simple and inexpensive spring trip, capable of being constructed of sufficient strength to enable it to be employed on stirring and breaking plows as well as cultivators, planters and the lighter class of agricultural implements, and adapted to be arranged at the beam in order to be out of the way of trash, so that the latter will not collect and interfere with the free action of the trip, whereby a perfect and easy operation of the same is assured at all times, so that there will be no liability of breaking or otherwise injuring any of the parts of a plow or cultivator should the plowshare, shovel, or other soil engaging device come in contact with a stump or other dangerous obstruction.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing: Figure 1 is a longitudinal sectional view of a spring trip, constructed in accordance with this invention and shown applied to a cultivator beam. Fig. 2 is a plan view of the same. Fig. 3 is a horizontal sectional view on the line 3—3 of Fig. 1.

Like numerals of reference designate corresponding parts in all the figures of the drawing.

In the accompanying drawing in which is illustrated the preferred embodiment of the invention, 1 designates a cultivator beam, equipped at its rear end with side plates 2 fitted against the side faces of the beam and spaced apart by the same and projecting rearwardly from the beam to receive and support the upper portion 3 of a shank or standard 4. The side plates permit the beam and the shank piece to be constructed of separate pieces, and at the same time afford the requisite strength to enable the trip to be used on the heavier type of agricultural implements, such as stirring and breaking plows, and if a part should become broken it may be readily replaced without discarding the beam. The side plates are secured to the rear end of the plow beam by means of transverse bolts 5, which also fasten an inclined post or support 6 to the same. The post, which has a bifurcated lower end 7, straddles the standard and the side plates at the front portions thereof, and the sides of the bifurcated lower portion of the post are pierced by the said bolts 5, which also pass through the beam and both of the side plates, as clearly indicated in Fig. 3 of the drawing. The post 6, which extends upwardly and rearwardly, is tapered toward its upper end, and it is provided adjacent its top with an elongated opening 8, through which passes a rod or bolt 9.

The bolt 9, which supports a coiled spring 10, has a threaded upper end 11 and it extends downwardly and rearwardly from the post, and is provided at its lower end with a rounded head 12, which is fitted in a correspondingly shaped socket or seat 13 in the upper portion 3 of the shank 4. The upper portion 3 of the shank is normally arranged in a horizontal position, and it is secured between the rearwardly projecting portions of the side plates by a transverse pivot bolt 14. The coiled spring 10 urges the horizontal portion of the shank 4 downwardly and maintains the same in normal position and in engagement with a transverse bolt 15, piercing the projecting portions of the side plates and extending across the space between the same, and arranged to be engaged by a shoulder 16 of the upper horizontal portion 3 of the shank. The horizontal portion 3 of the shank is recessed at its upper edge to form the shoulder 16, and the seat or socket 13 is formed in the rear wall of such recess 17. The front end 18 of the horizontal portion 3 of the shank 4 is convexly curved or rounded from top to bottom, and the rear end 19 of the beam 1 is concavely curved and spaced from the curved end face of the shank, which clears the beam when the shank swings on its pivot 14.

The upper threaded end 11 of the bolt receives a nut 20, which is adapted to be adjusted for varying the tension of the spring 9, and a washer 21 is interposed between the upper end of the spring and the post to prevent the spring from being crowded in the elongated opening 8. The lower end of the spring is seated against the head of the bolt, and the socket or seat forms a bearing for the rounded head 12. The elongated opening 8 permits a movement of the bolt in a direction longitudinally of the post. By this construction, the bolt, which carries the spring, is adapted to adjust itself to the pivotal movement of the shank when the latter is forced upwardly and rearwardly, as illustrated in dotted lines in Fig. 1 of the drawing. The spring is of sufficient strength to hold the shoulder 16 normally in contact with the bolt 15.

The post is provided at its upper end with spaced slots 22 in which are pivoted the upper ends of upper inclined links 23, which are spaced apart and connected at their lower ends by a transverse pivot bolt 24 with the upper end of a lower inclined link 25. The upper ends of the links are pierced by a transverse pivot bolt 26, which passes through the upper end of the post 6. The lower end 27 of the lower link is bifurcated to straddle the upper portion 3 of the shank 4, and it is pivoted to the same by a transverse bolt 28, piercing the shank and extending through the side portions of the bifurcation of the lower link. The lower link is provided at its upper end with side recesses 29, receiving the lower ends of the upper links and forming rear shoulders 30, arranged to engage the rear edges of the said upper links for limiting the relative movement of the upper and lower links to maintain the same in slight angular relation and prevent the links in the forward or inward movement thereof from assuming a position in direct alinement with their connecting pivot 24 in line with the upper pivot 26 and the lower pivot 28 and thereby interfering with the upward swing of the shank when the shovel 31, or other soil engaging device comes in contact with a dangerous obstruction.

In operation, when the shovel or share strikes a stump, root, or the like, the share piece is forced upwardly by such obstruction, thus causing the lower link to be pressed upwardly toward the upper link and the lower ends of the latter and the upper end of the lower link swing upwardly and rearwardly. The upward swing of the horizontal portion 3 of the shank 4 carries the bolt 9 upwardly and forwardly and compresses the spring. This operation lifts the shank out of danger of the obstruction, and after passing over the obstruction the spring forces the shank back to its proper normal position. The links 23 and 25 are adapted through the adjustment of the bolt 24 to control the operation of the spring and the said bolt 24, which is adapted to be tightened or loosened to produce the desired action of the tripping device. The tightening of the bolt 24 clamps the links 23 against the opposite side of the upper end of the link 25 and resists pivotal movement of the links on each other in the tripping action of the device. If the bolt 24 is made sufficiently tight to hold the pressure, it will prevent the tripping action of the device.

The spring trip is adapted to be employed on any kind of a beam where it can be placed above the shovel or share toward or near the line of the share point, and as it is arranged above the beam, it will not collect trash and the latter will be prevented from interfering with the free and easy operation of the trip. Furthermore, the spring by being arranged in rear of the post is protected by the latter. The trip may be constructed of a size and strength to adapt it to the character of the plow or cultivator on which it is to be used.

What is claimed is:—

1. In a device of the class described, the combination with a beam, of a post extending upwardly at the rear portion thereof, a shank pivoted in rear of the post, a bolt extending upwardly from the shank and slidable through the post, a spring disposed on the bolt and interposed between the post and the shank for urging the latter downwardly and forwardly and adapted to permit the shank to swing upwardly and rearwardly, and pivoted links connected with the post and with the shank for limiting the downward and forward movement of the said shank.

2. In a device of the class described, the combination with a beam, of a support mounted on and extending upwardly from the same, a shank pivoted in rear of the support and adapted to carry a soil engaging device, a rod slidable in the support and extending downwardly therefrom to the shank, a spring disposed on the rod for yieldably maintaining the shank in operative position, and upper and lower links pivoted, respectively, to the support and to the shank, said links being pivotally connected together and provided at their adjacent ends with coacting means for maintaining them in angular relation.

3. In a device of the class described, the combination with a beam, of a post extending upwardly at the rear portion thereof, a shank pivoted in rear of the post, a bolt extending upwardly from the shank and slidable through the post, a spring disposed on the bolt and interposed between the post and the shank for urging the latter downwardly and forwardly and adapted to permit the shank to swing upwardly and rearwardly, a lower link pivoted at its lower end to the shank and provided at its upper end with side recesses forming rear shoulders, and a pair of upper links pivoted at their upper ends to the post and at their lower ends to the lower link in the side recesses thereof and arranged to engage the said shoulders, which form stops to maintain the links in angular relation.

4. In a device of the class described, the combination with a beam, of side plates secured to the beam and extending rearwardly therefrom, an inclined post extending upwardly and rearwardly from the beam, a shank pivoted between the plates in rear of the beam, a spring interposed between the shank and the post, and upper and lower inclined links pivoted together at their adjacent ends, the lower link being pivoted to the shank and the upper link being pivotally connected to the post, said links being provided at their adjacent ends with co-acting means for maintaining them in angular relation.

5. In a device of the class described, the combination with a beam, of side plates extending rearwardly from the beam, a post straddling the beam and the plates and secured to the same and provided at its upper portion with spaced slots and with a centrally arranged opening, a shank pivoted between the plates in rear of the post and provided with a seat, a bolt slidable through the opening of the post and having a head at its lower end fitted in the said seat, a spring disposed on the bolt and interposed between the shank and the post, a lower inclined link pivoted to the shank, and upper inclined links pivoted at their upper ends in the slots of the post and having their lower ends pivotally connected to the upper ends of the lower links, said links being provided at their adjacent ends with co-acting means for maintaining them in angular relation.

In testimony that I claim the foregoing as my own, I have hereto affixed my signature in the presence of two witnesses.

THOMAS B. ALSUP.

Witnesses:
  H. O. COFFEE,
  J. W. WEST.

---

Copies of this patent may be obtained for five cents each, by addressing the "Commissioner of Patents, Washington, D. C."